(12) United States Patent
Chandhoke

(10) Patent No.: US 8,082,515 B2
(45) Date of Patent: Dec. 20, 2011

(54) MOTION CONTROLLER THAT SUPPORTS STANDARD AND CUSTOM AXES

(75) Inventor: Sundeep Chandhoke, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1048 days.

(21) Appl. No.: 11/948,421

(22) Filed: Nov. 30, 2007

(65) Prior Publication Data
US 2009/0144647 A1    Jun. 4, 2009

(51) Int. Cl.
*G06F 3/048* (2006.01)

(52) U.S. Cl. ............. 715/771; 700/90; 700/95; 700/117

(58) Field of Classification Search .................... 715/771
See application file for complete search history.

(56) References Cited

U.S. PATENT DOCUMENTS

| | | | |
|---|---|---|---|
| 5,392,207 A * | 2/1995 | Wilson et al. ................... | 700/64 |
| 6,442,442 B1 | 8/2002 | Weinhofer | |
| 6,980,869 B1 | 12/2005 | Chandhoke | |
| 7,035,697 B1 | 4/2006 | Brown | |
| 7,076,332 B2 | 7/2006 | Cifra et al. | |
| 7,143,301 B2 | 11/2006 | Pearce et al. | |
| 7,180,253 B2 | 2/2007 | Weinhofer et al. | |
| 7,210,117 B2 * | 4/2007 | Kudukoli et al. ............. | 717/100 |
| 7,568,172 B2 * | 7/2009 | Breyer et al. .................. | 716/139 |
| 2002/0126151 A1 | 9/2002 | Chandhoke et al. | |
| 2002/0129333 A1 | 9/2002 | Chandhoke et al. | |
| 2002/0191023 A1 | 12/2002 | Chandhoke et al. | |
| 2006/0064183 A1 | 3/2006 | Chandhoke et al. | |
| 2006/0161300 A1 * | 7/2006 | Gonzalez-Banos et al. .. | 700/245 |

* cited by examiner

*Primary Examiner* — Alvin Tan
(74) *Attorney, Agent, or Firm* — Meyertons Hood Kivlin Kowert & Goetzel, P.C.; Jeffrey C. Hood; Joel L. Stevens

(57) ABSTRACT

System and method for developing a motion application. A motion manager component implementing a supervisory control function and at least one trajectory generation algorithm is stored on a motion controller. A first application programming interface (API) for interfacing the motion manager component to a user developed motion control application is displayed. A second API for interfacing the motion manager component to a user developed communication interface component is displayed. A user application executable for sequencing motion operations in the motion system is created using the first API is created in response to user input. A first communication interface component is created using the second API in response to user input, where the communication interface component is operable to interface with the motion manager component using the second API, and where the user developed communication interface component is executable to communicate with a motion element, e.g., a drive or simulation.

19 Claims, 14 Drawing Sheets

MOTION CONTROLLER THAT SUPPORTS STANDARD AND CUSTOM AXES

FIELD OF THE INVENTION

The present invention relates to the field of programmable controllers, and more particularly to a programmable controller for both standard and custom axis control.

DESCRIPTION OF THE RELATED ART

In recent years, motion controllers have become central for controlling many aspects of industrial testing, production, and operations, e.g., as part of control, measurement, and automation systems. A motion controller typically controls one or more axes, i.e., controllable dimensions, such as, for example, position, velocity, angle, and so forth. A typical motion control system for controlling position or velocity generally includes the following components:

1. A motion controller that creates the command signals to achieve a specified or required position or velocity of a motor/actuator. The motion controller generates a motion profile corresponding to the requirements, and closes position and/or velocity control loops to create these appropriate command signals, where closing a loop refers to implementing a feedback loop for controlling a parameter, e.g., position or velocity.

2. A communication interface to a drive/amplifier that converts the command signals from a motion controller to actual digital or analog values that the drive/amplifier can interpret.

3. A drive/amplifier that receives the digital or analog data from a motion controller via a communication interface and converts the data to real current/voltage that it applies to an actuator/motor to perform the commanded motion.

4. An actuator/motor that receives the current/voltage from the drive and moves accordingly.

5. Feedback sensors connected to the actuator/motor that help close the control loops, i.e., that generate feedback signals, e.g., providing instantaneous position and/or velocity information to the drive/amplifier and the motion controller.

6. Motion IO (input/output means) that relays information such as limit switches, drive/amplifier status, and other synchronization information back to the motion controller via the communication interface.

FIG. 1 illustrates a typical motion control system that includes each of these components, according to the prior art. As shown, the motion control system includes a motion controller 10, coupled to a communication interface 12. The communication interface 12 is coupled to a drive 14, which is in turn coupled to a motor (or more generally, an actuator) 16, denoted by a circle labeled "M". As indicated, the motion control system receives an operation sequence from a user's application via an application programming interface (API). In other words, the user's application creates the sequence of operation and sequential logic for a motion control task, and interfaces with the motion controller using an API specific to that controller. The motion controller 10 receives each sequence from the application and generates a motion profile accordingly. This profile is then provided as setpoints for position and velocity control loops to respectively control position and velocity.

As FIG. 1 indicates, the motion controller 10 interacts with the drive 14 and motor 16 through the communication interface 12, which may be digital, e.g., a serial communication bus interface, or explicit analog wiring coupling the drive 14 and the motion controller 10. This interface is typically built into the motion controller and drive, i.e., is part of both devices. The drive 14 acts as an amplifier and controls current and voltage applied to the motor 16 based on output from the motion controller. In many cases the drive also closes the position and/or velocity loops, i.e., forms a feedback loop with respect to position and/or velocity. As also indicated in FIG. 1, in addition to the motor, the drive 14 may also couple to various electrical and mechanical components as appropriate to the particular application being implemented. Of course, the motor, which is used herein to refer to any kind of actuator, is coupled to a motion platform or other apparatus, and operates to move the motion platform or apparatus in accordance with the motion profile, e.g., controlling the position and/or velocity of the motion platform or apparatus. One or more sensors 18 may be coupled to the motor (or actuator) 16, and may operate to provide real world data regarding the current state of the motor (or actuator) back to the drive and/or communication interface, as shown.

Some motion control applications may be implemented with standard, off-the-shelf, components, although many require custom solutions. In most motion control applications that require customization, the requirements are:

1. A non-supported communication interface, i.e., one that is not supported by an off-the-shelf motion controller.

2. Special IO, e.g., high speed synchronization with an external stimulus, or other functionality that is not generally supported by standard motion controllers.

3. Custom control algorithms for position and/or velocity control. Typical motion controllers implement a PID (proportional, integral, derivative) algorithm for position and velocity control, which in low inertia nonlinear systems may be ineffective in controlling the motor/actuator.

Currently the only ways to achieve such customization are:

1. Create a custom motion controller using as much off-the-shelf hardware and software as possible.

2. Have a motion control vendor build a motion controller in accordance with specific custom requirements.

3. Use a motion controller which allows customizing control loops by compiling and downloading code to its embedded processor. However, this approach is extremely restrictive, has a very high learning curve, and typically requires high levels of interaction with the motion controller vendor. Moreover, there are currently no available means to customize the communication interface or IO connected to the motion controller using this methodology.

However, the above customization solutions suffer from one or more of the following:

1. Very low scalability since each solution is built specific to an application need.

2. A much higher learning curve is required for individuals that inherit the projects, especially in the case of a totally custom motion controller.

3. High degrees of dependability on the motion controller vendor for bug fixes and upgrades, thereby increasing the cost to maintain and upgrade.

4. Intellectual property protection issues due to (3).

5. Standard (no customization required) and custom axes cannot be used on the same motion controller. In other words, a developer must generally choose between using a standard off-the-shelf motion control system, which may lack desired functionality, or building a fully customized motion control system, which may be difficult, expensive, and error prone, as well as introducing issues such as steep learning curves for new users.

Thus, improved systems and methods for developing motion control applications are desirable.

SUMMARY OF THE INVENTION

Various embodiments of a system and method for developing a motion application are presented.

A motion manager component may be stored on a motion controller, where the motion manager component implements a supervisory control function and at least one trajectory generation algorithm. It should be noted that the term "motion manager component" is meant to be descriptive only, and is not intended to limit the invention to any particular form or function.

A first application programming interface (API) for interfacing the motion manager component to a user developed motion control application may be displayed. The first API may be displayed in any of a variety of ways. For example, in some embodiments, one or more menus or lists of API functions may be displayed, from which API calls may be selected. In another embodiment, the first API may include a plurality of graphical program nodes, e.g., a palette of graphical program nodes, from which the user may select nodes for inclusion in a graphical program.

A second API for interfacing the motion manager component to a user developed communication interface component may be displayed. As with the first API, in various embodiments, the second API may be displayed in any of a variety of ways, e.g., via one or more menus or lists of API functions, or via graphical program nodes. For example, in some embodiments, the second API for interfacing to a user developed communication interface component may include one or more graphical program nodes, where each of the one or more graphical program nodes is operable to be included in a graphical program, and where each of the one or more graphical program nodes is executable to interface to the motion manager component. In one embodiment, the second API may be in the form of a plurality of graphical program nodes, e.g., a palette of graphical program nodes, where the nodes are selectable by the user for inclusion in a graphical program.

A user application may be created using the first API in response to user input, where the user application is executable for sequencing motion operations in the motion system. Said another way, the user may create the user application for the motion control system, where the user application includes API calls from the first API. As noted above, in some embodiments, the user may create the application by dragging and dropping (or otherwise selecting) graphical program nodes from the first API onto a block diagram of a graphical program. In other embodiments, e.g., in text-based programming systems, the user may simply include textual API function calls in a text-based application program. In other embodiments, any other means for making API calls in the user application may be used as desired.

A first communication interface component may be created using the second API in response to user input, where the communication interface component is operable to interface with the motion manager component using the second API. The user developed communication interface component may be executable to communicate with a motion element, which in various embodiments may be a drive, e.g., that controls or drives a motor or other actuator, or a simulation, e.g., a drive simulator. Such simulations may be used, for example, in product development or testing, e.g., when the actual physical motors or actuators are not available or not needed.

The motion controller preferably includes a processor and memory (which may include multiple memory media, possibly distributed over a network), where the memory stores the motion manager component, the user application, and the user developed first communication interface component. Moreover, the motion controller may be included in a motion control system, also referred to as a motion system, that includes a motion element (a drive or simulation). The motion controller may be coupled to the motion element, and may be operable to control the motion element, i.e., providing trajectory information to the motion element, e.g., for controlling a UUT.

A vendor-defined communication interface component may be stored, where the vendor defined communication interface component is configured to communicate with a pre-defined motion element, e.g., a standard or vendor-supplied drive. In other words, in addition to the user-defined communication interface component, a vendor-defined communication interface component may be also be stored for use, e.g., in conjunction with the user-defined communication interface component. For example, in one embodiment, both custom and pre-defined axes may be specified and implemented in the motion control application, e.g., to control respective motion elements. In another embodiment, the first communication interface component may be operable to interface with the vendor-defined communication interface component. In other words, the first (custom) communication interface component may be communicatively interposed between the motion manager and the vendor-defined communication interface component, and may thus affect operations of that component. Thus, in this way, the user-developed first communication interface component may be used to implement at least partial customization of the vendor-defined communication interface component.

Note that, in preferred embodiments, the motion (control) system may be operable to perform motion scans at a specified frequency, and the first communication interface component may be configured to execute at the specified frequency. Note also that the user application may not be so constrained.

The motion control application may then be deployed and/or executed as desired to perform the specified motion tasks.

Thus, various embodiments of the above systems and methods may allow a user to develop and use a motion control system that may include one or more custom control axes, and may also accommodate one or more vendor-defined (i.e., pre-defined) axes.

BRIEF DESCRIPTION OF THE DRAWINGS

A better understanding of the present invention can be obtained when the following detailed description of the preferred embodiment is considered in conjunction with the following drawings, in which:

FIGS. 16A and 16B illustrate an exemplary custom graphical communication interface component, according to one embodiment.

Figure 1:
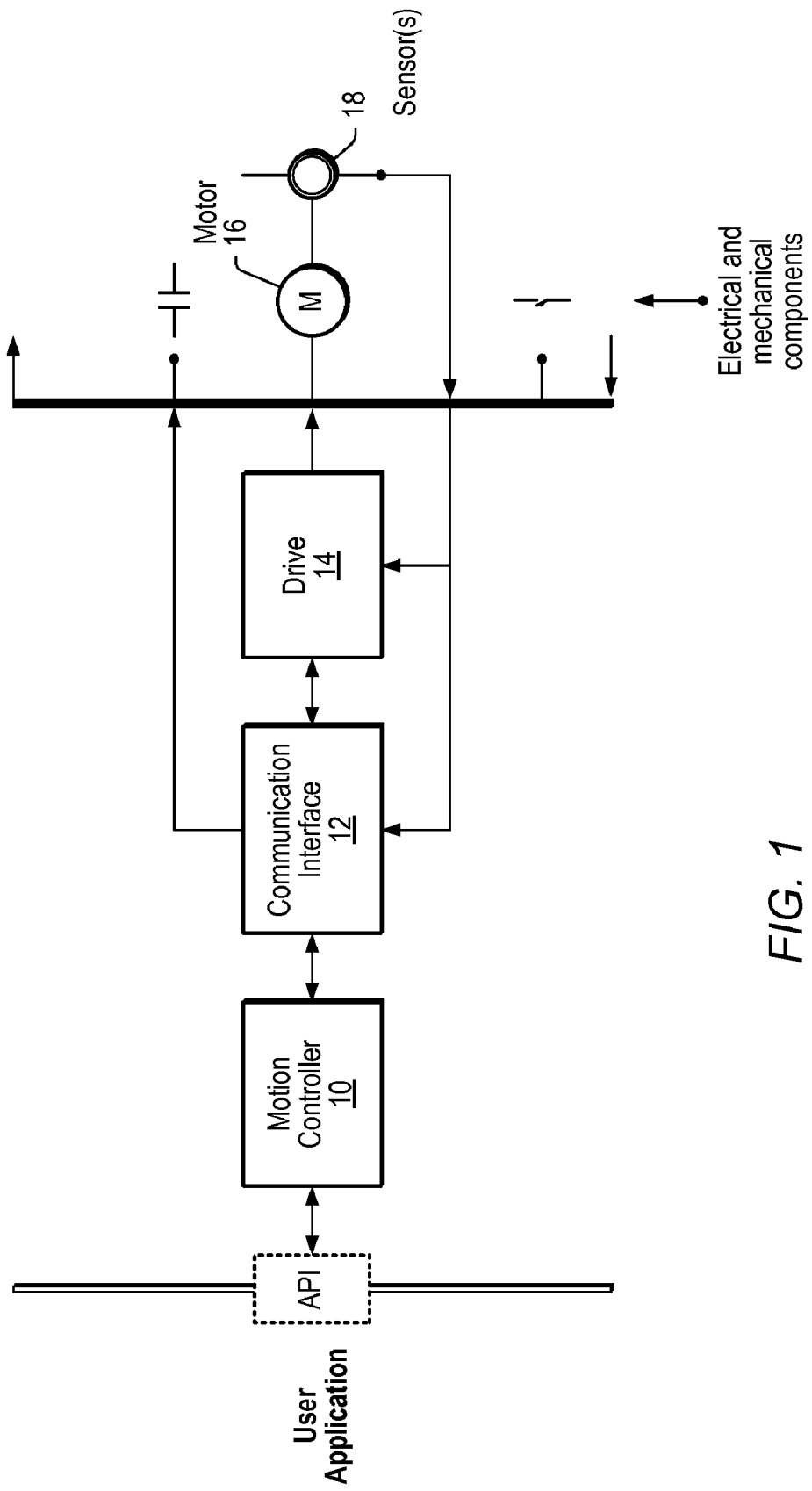
FIG. 1 illustrates a typical motion control system, according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

INCORPORATION BY REFERENCE

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. application Ser. No. 11/338,922, titled "System and Method for Automatically Updating the Memory Map of a Programmable Logic Controller to Customized Hardware", filed Jan. 24, 2006.

U.S. application Ser. No. 11/427,052, titled "System and Method for Automatically Updating the Memory Map of a Programmable Controller to Customized Hardware," filed Jun. 28, 2006.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may include two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE 7from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others. A LabVIEW graphical program, may be referred to as a "virtual instrument" (VI).

The term "graphical program" includes models or block diagrams created in graphical modeling environments, wherein the model or block diagram includes interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may include only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may include a single window having one or more GUI Elements, or may include a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may include GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements include input controls and output indicators Input Control—a graphical user interface element for providing user input to a program. Exemplary input controls include dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Programmable Controller—programmable controllers may include programmable logic controllers (PLCs), programmable automation controllers (PACs), distributed control systems (DCSs), and/or other programmable controllers which utilize scanning architectures.

Task—A task may be included in a programmable controller and may itself include programs and variables, e.g., variables used by the programs. A task may define the schedule and/or manner in which the programs may be executed on the programmable controller, and may include a memory table that is updated before the execution of programs included in the task. For execution, the programs in the task may be assigned an execution order within the task, i.e., the order defines priority of program execution. Additionally, in a multitasking environment, each task may be assigned a specified priority with respect to the other tasks.

Axis—a logical grouping that includes the components used to control a parameter, e.g., position or velocity, in a motion control system. For example, a motion control axis may include a motor (i.e., actuator), encoder (optionally), IO needed to control the motor effectively (limit switches, home sensors etc.), and control software (supervisory control, trajectory generation, position, velocity and current control loops) for the motor.

Programmable Controllers

The following describes embodiments of systems which utilize PLCs, PACs, and/or DCSs. Note that embodiments herein described with respect to PLCs may equally apply to embodiments with PACs and/or DCSs. In particular the embodiments may apply to those programmable controllers which implement scanning architectures, such as, for example, those described below. Note however, that the programmable controllers are not limited to those described herein, and that other programmable controllers are envisioned.

The term "programmable automation controller" is intended to capture the full breadth of its ordinary meaning and at least includes the characteristics described herein. In general, PACs combine the features of normal PLCs, such as those described above, with the capabilities of computer system control systems, e.g., using a personal computer. In some cases, PACs may provide a more open, modular programming environment than provided by normal PLCs. Additionally, such PACs may provide the protection and stability provided by PLCs that personal computing systems generally lack. For example, the PACs may include a ruggedized housing for protection from the local environment which can sometimes be quite corrosive. Additionally, the PACs may be generally more stable than personal computing systems simply due to the nature of current standard personal computing operating systems. Thus, in some embodiments, at least one PAC, e.g., using the scanning architecture described herein (e.g., with reference to FIG. 3), may be used in conjunction with the architectures, systems, and methods described above.

Additionally, the term "distributed control system" (DCS) is also intended to capture the full breadth of its ordinary meaning and at least includes the characteristics described herein. In general, DCSs include one or more instruments or computing systems for implementing various processes, such as those described above in relation to the use of PLCs. Thus, similar to the above descriptions regarding PACs, one or more DCSs may be used in conjunction with the systems and methods described herein.

Figure 2:
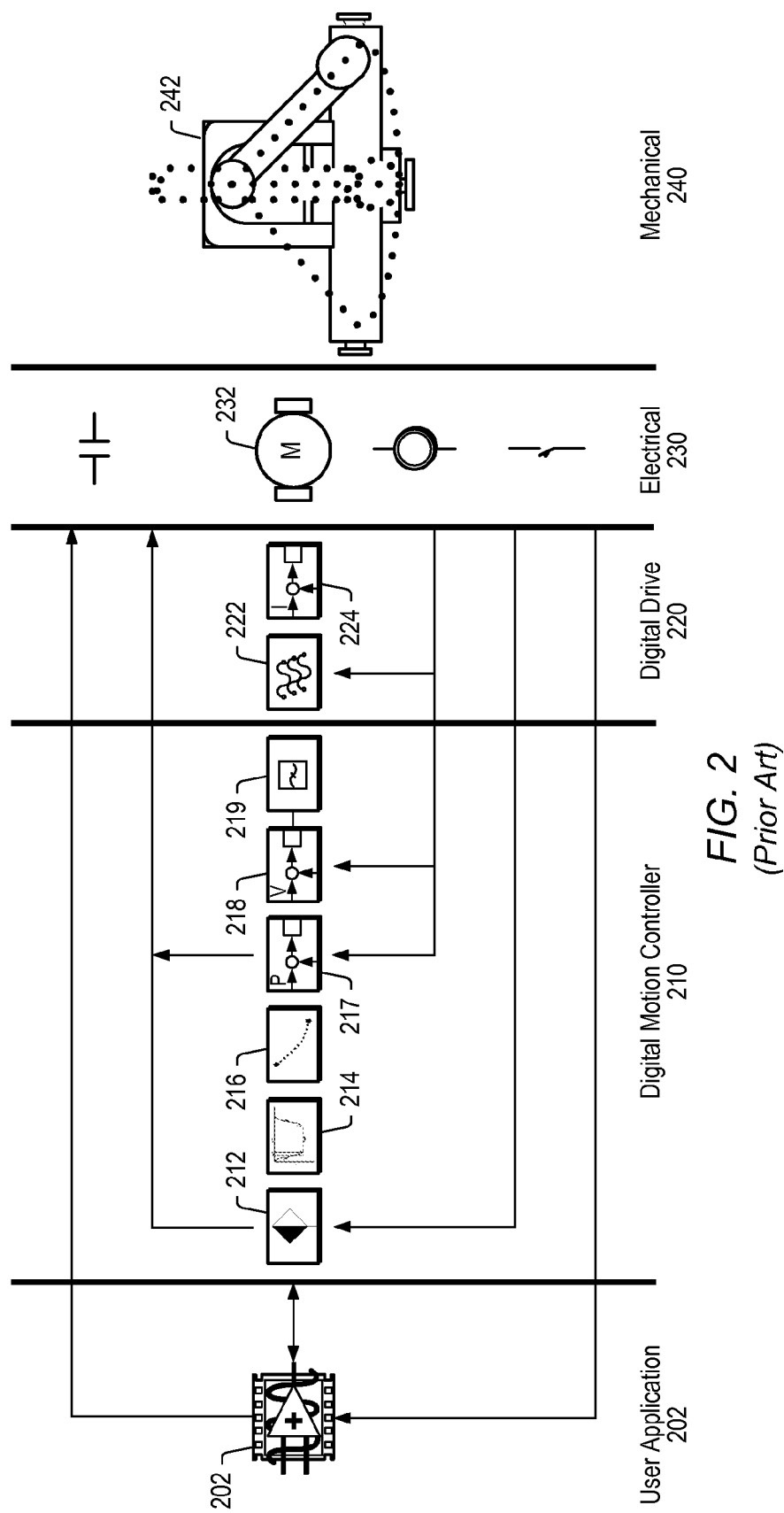
FIG. 2 illustrates a more detailed motion control system for controlling position and velocity, according to the prior art.

FIG. 2—Motion Control System Components

FIG. 2 illustrates various components of an exemplary motion control system, according to the prior art. This particular system is organized into five portions: a user application 202, a motion controller (software and/or hardware) 210, a drive 220, electrical components 230, and mechanical components 240. As may be seen, the motion controller 210 includes a supervisory control component 212, a trajectory generator 214, an interpolator 216, control loops 217 and 218, and filter(s) 219. The supervisory control component 212 may communicate with the user application 202 via a user application programming interface (API). The supervisory control component primarily acts as a control unit for the trajectory generator. It handles requests from the user application and sequences the commands to achieve the desired goals. The supervisory component may also be operable to manage I/O (input/output) reactions, trajectory generator control, gearing and camming, and position based synchronization, among others. For example, in various embodiments, the supervisory control component may respond to the I/O connected to the motion controller and may command the trajectory generator to achieve some or all of the following functionality:

Limit switch reaction: commands the trajectory generator to stop, if a limit is encountered Reference moves: commands the trajectory generator to move the motor while it monitors for mechanical switches/encoder index activation. Once a limit switch or encoder index is encountered, it commands the trajectory generator to move the axis to the position at which the encounter occurred.

Electronic gearing: monitors a feedback device such as encoder and slaves the command output for an axis to it, applying specified ratios and offsets. This is useful in a lot of packaging applications, where an axis is required to be synchronized to an external unit such as a conveyor or web.

Camming: uses the electronic gearing feature to smoothly change gear ratios based on specified position intervals in table/buffer.

Motion Scope: logs user specified data periodically to help monitor vibrations, tune servos, etc.

Other supervisory control functions may also be included as desired.

The trajectory generator 214 is responsible for profile generation, path planning, and coordinated motion. The interpolator 216 generates intermediate positions for the trajectory if the control loops run at a faster rate than the trajectory. In other words, if the trajectory has a lower temporal resolution than the control loops, the interpolator will interpolate additional points for the trajectory in accordance with the time resolution of the control loops. In this exemplary prior art motion controller, the control loops include a position loop 217, operable to control position, and a velocity loop 218, operable to control velocity. The filter(s) 219 operate to process the control signals, e.g., removing resonances, etc.

As FIG. 2 also shows, in this example system, the drive 220 includes a commutation component 222 for controlling the direction of current, e.g., to manage phase of a control current with respect to a motor, and a current loop component 224 that operates to control the current. The electrical components 230 include any of various electrical devices or components that the drive utilizes to control the motion, e.g., motors, such as motor 232, switches, sensors, etc. Similarly, the mechanical components 240 include any of various mechanical devices or components 242 used to control the motion, e.g., motion stages, hydraulics, mechanical switches, etc. It should be noted, however, that in other motion control systems, some of these components may be grouped differently, e.g., the control loops and/or filter(s) may be implemented in the drive, and so forth, as desired.

Note that in this typical motion control system, the drive closes the current loop and implements commutation, in which case the drive is called a torque or current amplifier. Optionally the drive can also close the velocity loop, in which case it is called a velocity amplifier. Finally, in cases where the drive closes both the position and velocity loops, the drive is referred to as a position amplifier. In all cases, however, the motion controller has responsibility for path planning (trajectory generation) and supervisory control. Note that the communication interface (not shown in FIG. 2) handles data transfer between the drive (based on its type) and any additional IO connected to the system. This communication interface can use a serial deterministic bus such as Controller Area Network (CAN) or SERCOS (Serial Realtime Communication System), or analog connectivity to an analog amplifier using analog and digital signals, among others, as desired.

It should be noted that the terms "motion controller" and "communication interface" may refer to hardware and/or software. For example, "motion controller" is generally used to refer to a controller that includes a processor, e.g., a real time processor (or multiple processors, and/or a multi-core processor), and memory, but may also be used to refer to motion control software executed by the controller. Similarly, "communication interface" may refer to a physical communication medium (CAN, SERCOS, analog wires, etc.) and/or to software components that utilize the physical medium.

Figure 3:
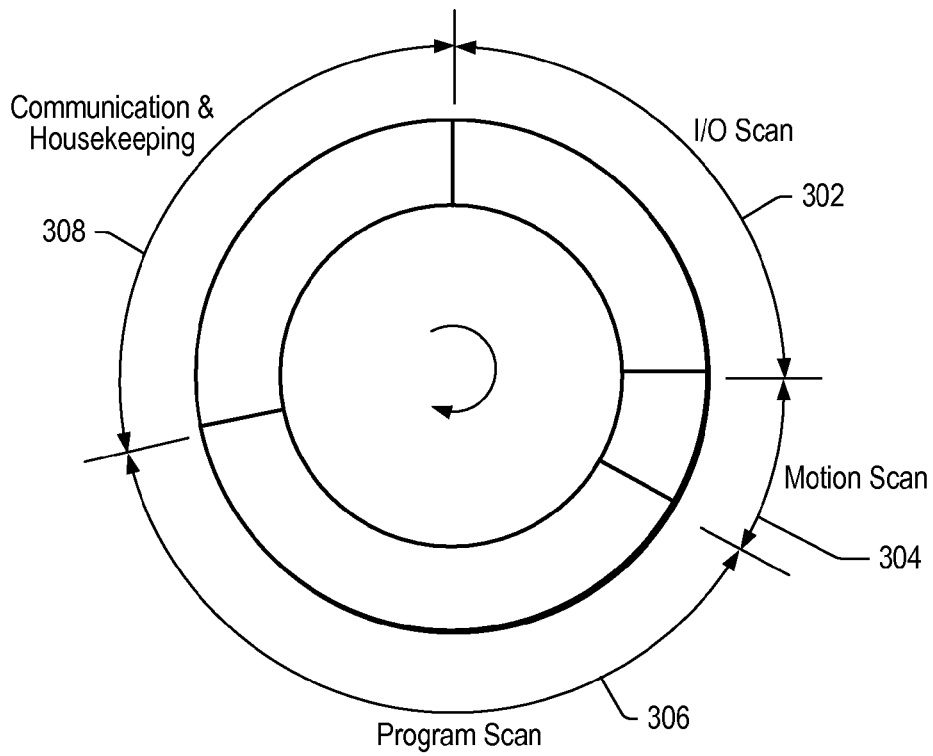
FIG. 3 illustrates an exemplary scanning cycle, according to the prior art.

A scanning architecture motion control system has a scan cycle during which various operations are performed. FIG. 3 illustrates an exemplary scanning cycle for a motion control system, according to the prior art. As may be seen, each cycle includes an I/O scan 302, a motion scan 304, a program scan 306, and communication/housekeeping 308. The scan diagram of FIG. 3 is a typical model of execution of a PLC (programmable logic controller) with integrated motion (i.e., a PLC whose processor is shared with a motion controller). Typically, the I/O scan involves receiving (or exchanging) I/O data with various devices or components, such as sensors, that provide real world data regarding the unit or system being controlled, e.g., the current position/velocity of a motion platform, mechanical arm, etc. The motion scan has the highest priority and runs after the IO in the controller has been updated. The user defined programs run in the program scan portion. Note that in a dedicated motion controller the program scan is optional. Generally, the motion controller runs its logic, e.g., supervisory control, trajectory generation, and the control loops (optionally), during the motion scan period when the controller scans every cycle. The communication/housekeeping portion of the scan cycle relates to other processes, such as GUI functionality, logging, system self-monitoring, diagnostics, etc., e.g., ongoing maintenance and infrastructure operations.

Figure 4:
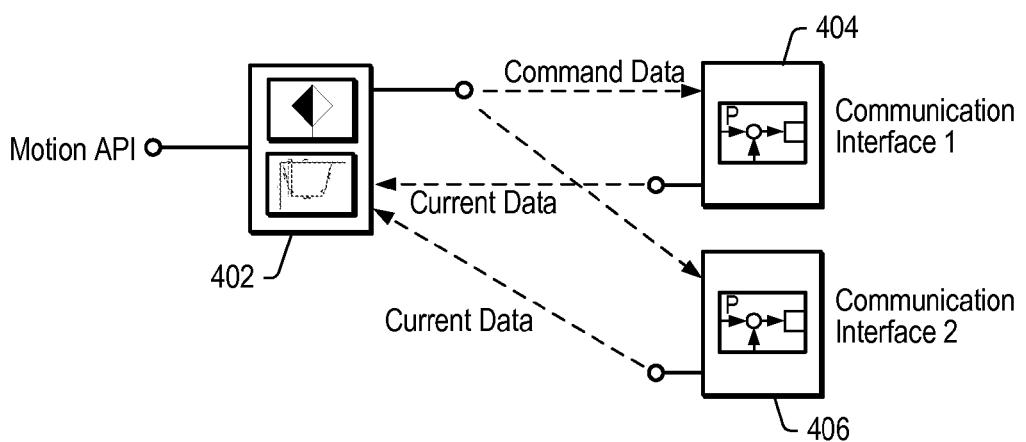
FIG. 4 illustrates a motion control system with multiple axes, according to the prior art.

FIG. 4 illustrates communication between a motion controller and multiple communication interfaces, specifically, communication interface 1 and communication interface 2, according to the prior art. As shown, in this system, the motion controller is represented by integrated supervisory control/trajectory generator component(s) 402. Per FIG. 4, the motion controller is operable communicate (e.g., with a user application) via a motion API. The supervisory component 212 is operable to send command data to each of communication interface 1 404 and communication interface 2 406, and the trajectory generator 214 is operable to receive current data from each of communication interface 1 404 and communication interface 2 406. Note that these communication interfaces are either both pre-defined ("off the shelf" components), or both custom interfaces (along with a custom motion controller). Thus, a motion controller may use multiple communication interfaces in implementing a motion control application. As noted above, prior art motion control systems do not have the capability to include both custom and pre-defined control axes.

In preferred embodiments of the present invention, a motion controller may be disaggregated into two main components:

A Motion Manager Component that implements the supervisory control and trajectory generation algorithms, and provides command data for all the drives. There may only be one implementation or instance of this component for a motion controller.

A Communication Interface Component that manages or handles communication with the drives, e.g., via analog/digital TO, or a digital network such as SERCOS/CAN/Deterministic Ethernet etc. Note that there can be multiple implementations or instantiations of this component if multiple communication buses are supported on one motion controller. Optionally, this component may also implement the control loops, depending on the type of drives it is communicating with.

This disaggregated architecture may facilitate novel functionality over prior art motion control systems, as will be described below in more detail.

In preferred embodiments, the real time processor that executes the motion scan should be capable of running at least one user program at the same rate as the motion scan. This may allow the user's custom logic (that customizes an axis) to run deterministically after the motion controller scan completes. Thus, with respect to the scan cycle of FIG. 3, the program scan support on the controller may be mandatory.

In some embodiments, the motion controller may provide or support a configuration environment that allows the user to specify whether an axis will use a pre-defined drive and communication interface, or a custom drive and interface. In other words, the user may be able to specify both pre-defined axes and custom axes for the same motion control system.

When a motion controller is developed in this way, user code (executing in the program scan) can access drive data that is updated every scan by the motion controller and can use this data in a custom communication interface component, optionally customizing control loops as desired, e.g., the position and velocity control loops. In other words, the custom communication interface may directly access data from a drive every scan cycle, and perform any custom functionality accordingly. Note that this accommodation of custom interfaces does not preclude the use of pre-defined axes in the same system.

Figure 5A:
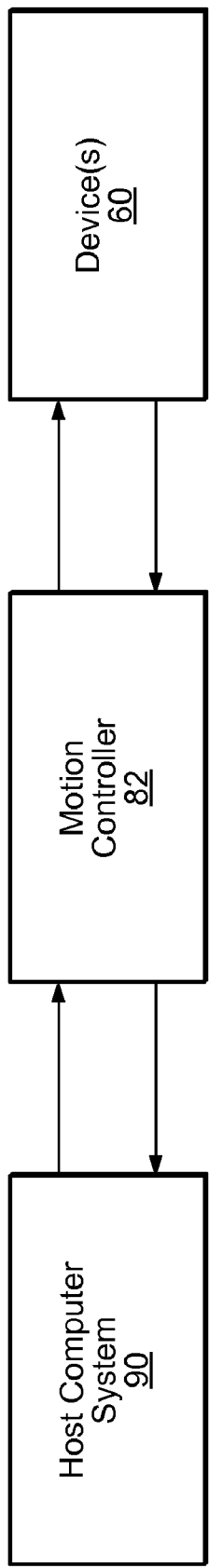
FIG. 5A illustrates a motion control system wherein the motion controller is coupled to a host computer system, according to one embodiment.
Figure 5B:
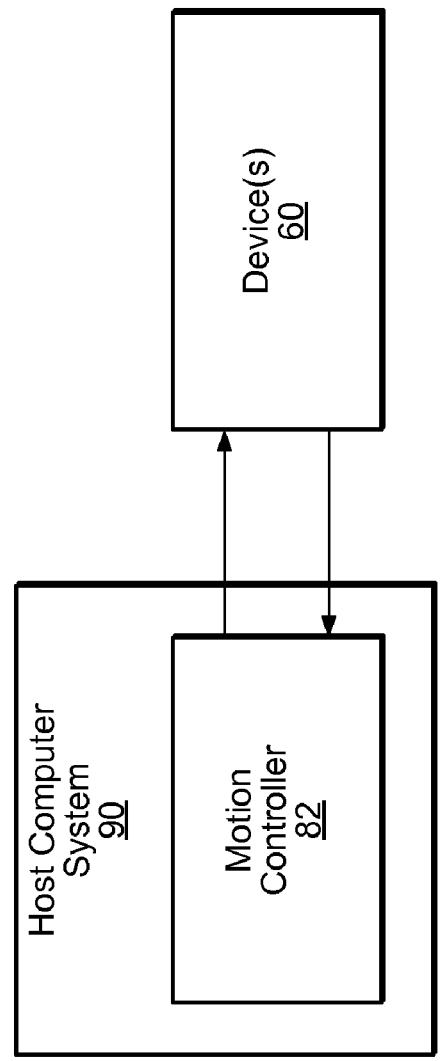
FIG. 5B illustrates a motion control system wherein the motion controller is implemented by a host computer system, according to one embodiment.

FIGS. 5A and 5B—Block Diagrams of Exemplary Motion Control Systems

FIGS. 5A and 5B are high level block diagrams of motion control systems, according to various embodiments. FIG. 5A illustrates a system wherein a host computer system 90 is communicatively coupled to a motion controller 82, which is in turn communicatively coupled to at least one device 60. The host computer system 90 may store a development environment for developing user motion control programs, e.g., user application code and/or custom logic for a custom communication interface. For example, in one embodiment, the host computer system 90 may store a LabVIEW graphical program development environment, provided by National Instruments Corporation, although in other embodiments, any other development environments and programming languages may be used as desired. In some embodiments, these programs may then be provided, e.g., over a network, to the motion controller for execution. In other embodiments, the host computer system 90 may store and execute the user motion control programs, e.g., user applications and/or custom code in the communication interface.

Note that in preferred embodiments, the motion control system described herein includes a PLC or PAC with integrated motion control, and may be referred to generically as a programmable controller, or simply a controller.

FIG. 5B illustrates an alternative embodiment where the host computer system 90 is or includes the motion controller 82. In other words, the various functionalities described above with respect to the host computer system 90 and the motion controller 82 may be performed by a single computer system, specifically, the host computer system.

Figure 6:
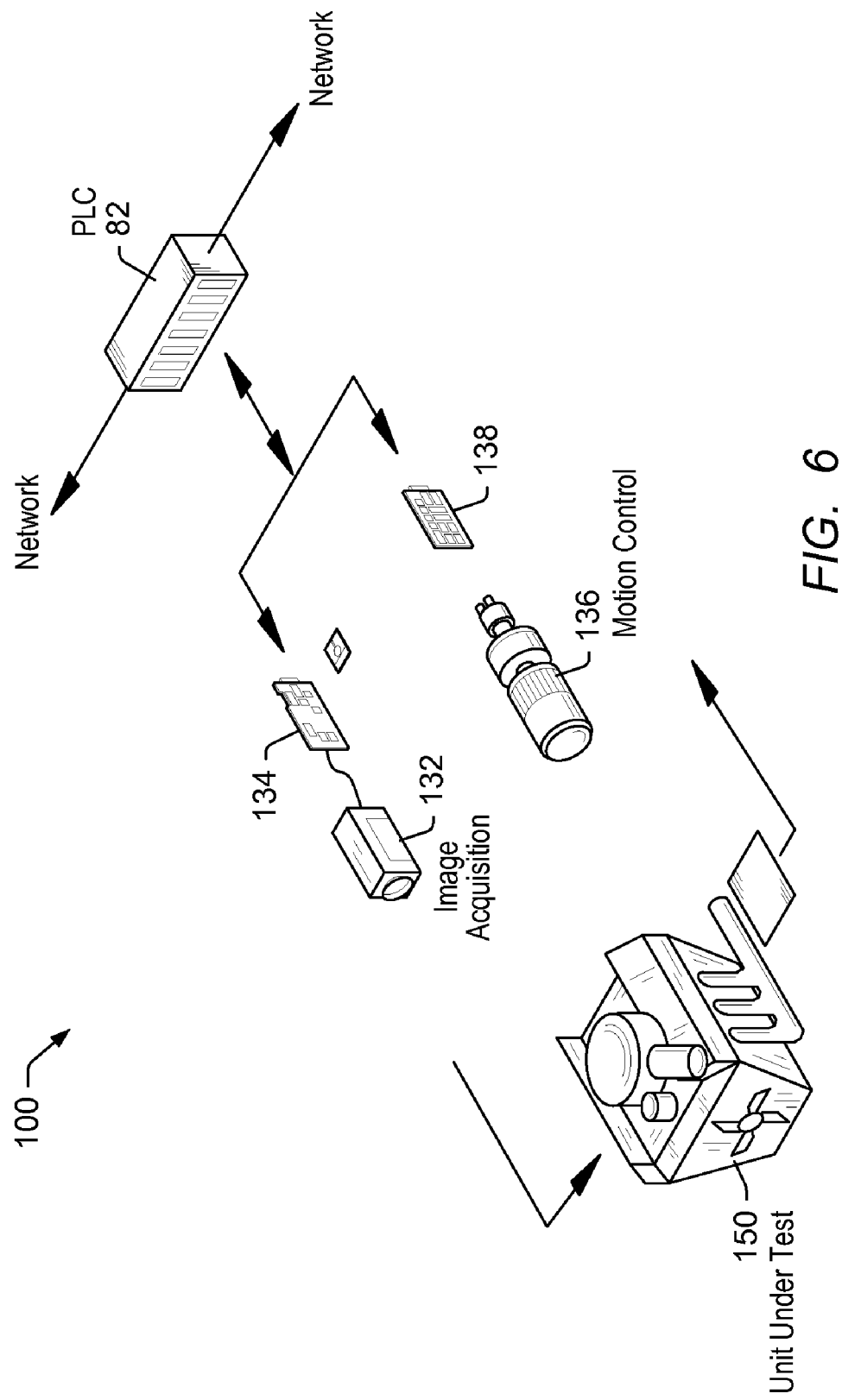
FIG. 6 illustrates an industrial automation system, according to one embodiment.

FIG. 6—Exemplary Motion Control System

FIG. 6 illustrates an exemplary motion control system 100 using a dedicated PLC, according to one embodiment. As FIG. 6 indicates, in this embodiment, a PLC 82, referred to as the controller, couples to a motion control device 136 via an associated motion control interface card 138, as well as to a data acquisition device, specifically, an image acquisition device 132, via an associated image acquisition interface card 134. The motion control device 136 interacts with or controls a unit under test (UUT) 150, which may any type device or component desired.

The controller may include one or more processors as well as a memory medium(s) coupled to the processor(s) on which one or more computer programs or software components may be stored. As used herein, "processors" may include processor cores or processing chips. For example, a programmable controller with multiple processors may include a single processing chip with multiple cores (e.g., 2, 4, 8, etc.) or may include multiple processing chips (e.g., multiple central processing units), where each processing chip includes one or more processors. Multiple processors may refer to any combination of chips and cores. The memory medium may store one or more programs which are executable to perform the methods described herein. In some embodiments, the programs may include graphical programs. Various embodiments further include receiving or storing instructions and/or data implemented in accordance with the foregoing description upon a carrier medium.

As indicated above, the controller may be coupled to one or more devices, e.g., device(s) 60 of FIGS. 5A and 5B, e.g., motion control device 136. In some embodiments, the devices may be coupled directly to the PLC via an electrical interface. In other embodiments, the device(s) may also be coupled to the controller via an intermediary device, e.g., another controller, a programmable hardware element (PHE), or other suitable devices. In another embodiment, the devices may be implemented at a remote location and may be coupled to the controller via a network, e.g., LAN, WAN, Internet, Intranet, etc. In one embodiment, the controller may communicate directly with the one or more devices, or, alternatively, an intermediary device may provide a network communication interface between the controller and the remote devices. In various embodiments, the controller may communicate with the remote devices directly, or via an intermediary device, using any of a variety of communication protocols, e.g., TCP/IP, GPIB, Ethernet (e.g., CSMA/CD), Local Talk (e.g., CSMA/CA), Token Ring, FDDI, ATM, NetBEUI, IPX/SPX, IPv6, CANopen, DeviceNet, PROFInet, EtherNet/IP, EtherCAT, Ethernet Powerlink, SERCOS, or other suitable communication protocols.

In some embodiments, the controller may be included in or coupled to a chassis. In various embodiments, the chassis may include one or more module expansion slots operable to receive expansion modules. The expansion slots may be operable to receive any of a variety of expansion modules, including, PCI, PCI Express, ISA, PXI, VXI, GPIB, or other suitable form factors and/or card types. The expansion modules may be coupled to and may communicate with the controller via a backplane. For example, the backplane may include the programmable hardware element, e.g., the FPGA, which may operate to provide input and output to the controller from one or more devices included in or coupled to the chassis, e.g., the expansion modules plugged into the expansion slots or other devices coupled to the chassis. Additionally, in various embodiments, the backplane may implement any of a variety of buses, including, but not limited to, a VXI (VME eXtensions for Instrumentation) bus, a GPIB (General Purpose Interface Bus) bus, a PXI (PCI eXtensions for Instrumentation) bus, a CAN bus, a Profibus bus, a serial bus, a parallel bus, or other suitable buses. In some embodiments, where the backplane includes or is a PHE, a user may be able to program the PHE such that the backplane performs operations on the input and output from the controller and/or the devices coupled to the chassis. Examples of operations or functions that the PHE may perform will be described in more detail below.

The controller may be coupled to the host computer system 90 via a network or a computer bus using any of various networks and protocols described above, among others. The computer system 90 may be any of various types, as desired. In some embodiments, a program executing on the computer system 90 may provide a human-machine interface (HMI) for the controller. For example, the program may be an HMI application executing on the host computer, and facilitating user interaction with the controller. In this embodiment, the program may receive input from a user on host computer system 90 with regard to instructions for the controller, which may then provide input to the controller accordingly. In some embodiments, the instructions may also be directed toward, and subsequently provided to, the PHE providing the hardware interface between the device(s) and the controller.

In some embodiments, the user programs, e.g., application and custom graphical programs, may execute in a distributed fashion. For example, with respect to the user application, at least one portion of the program, e.g., at least one portion of a block diagram of the program, may be implemented and/or executed on one or more PHEs coupled to the controller and another portion, e.g., another portion of the block diagram, may be implemented and/or executed on the controller. In one embodiment, one portion, e.g., the program's GUI, of the program may be executed on the host computer system coupled to the controller. More specifically, in one embodiment, a portion of the graphical program may execute on the controller (e.g., the controller may be configured according to the portion of the graphical program) and another portion of the graphical program (e.g., including the front panel of the graphical program) may execute (e.g., concurrent to execution of the graphical program portion on the controller) on the computer system 90, e.g., to provide an MMI for the graphical program portion executing on the controller.

In further embodiments, the controller may be a "soft" PLC (or controller), i.e., a computer program running on a computer system such as host computer system 90 that mimics the operation of a standard PLC or PAC (or controller). For example, the computer program may be a graphical program, such as a LabVIEW graphical program, and may operate to perform all the functionality of controllers described herein.

Figure 7:
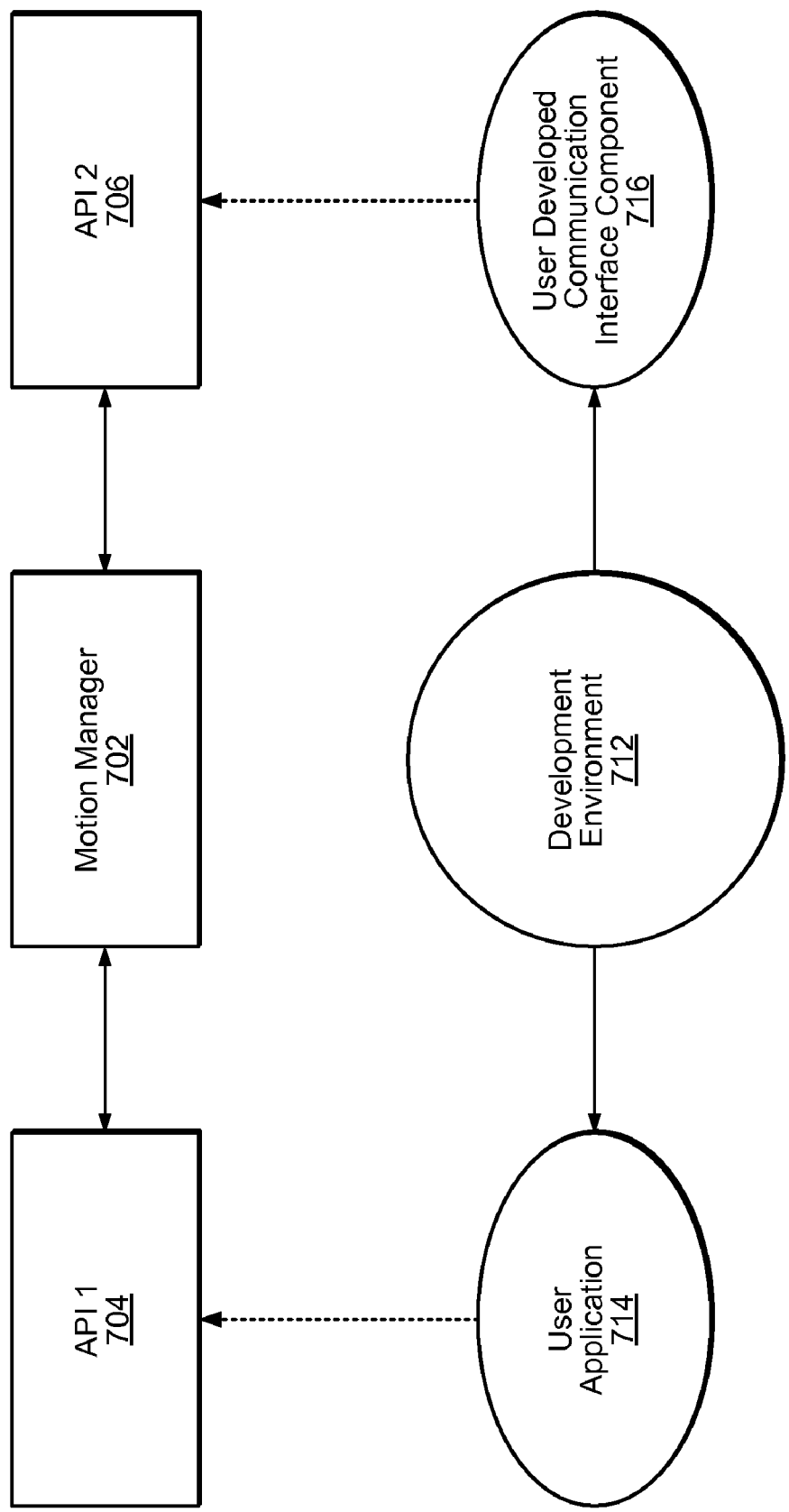
FIG. 7 is a block diagram illustrating motion control system software and its interrelations, according to one embodiment.

FIG. 7—Motion Control System Software

FIG. 7 illustrates motion control system software and its interrelations, according to one embodiment. As shown, a development environment 712 may be used to generate user code, specifically, a user application 714 and/or a user developed communication interface component (program) 716. Each of these user programs may communicate with a motion manager (component) 702 via respective APIs. For example, as FIG. 7 indicates, the user application 714 may interface with the motion manager 702 via a first API 704, labeled API 1 for convenience, and the user developed communication interface component (program) may interface with the motion manager 702 via a second API 706, labeled API 2. These two APIs may thus provide alternative or dual paths for communicating with the motion manager, as discussed in more detail below with reference to FIG. 8. Note that in various embodiments, these software programs or components may be stored in the same memory medium, or stored in multiple memory media.

Figure 8:
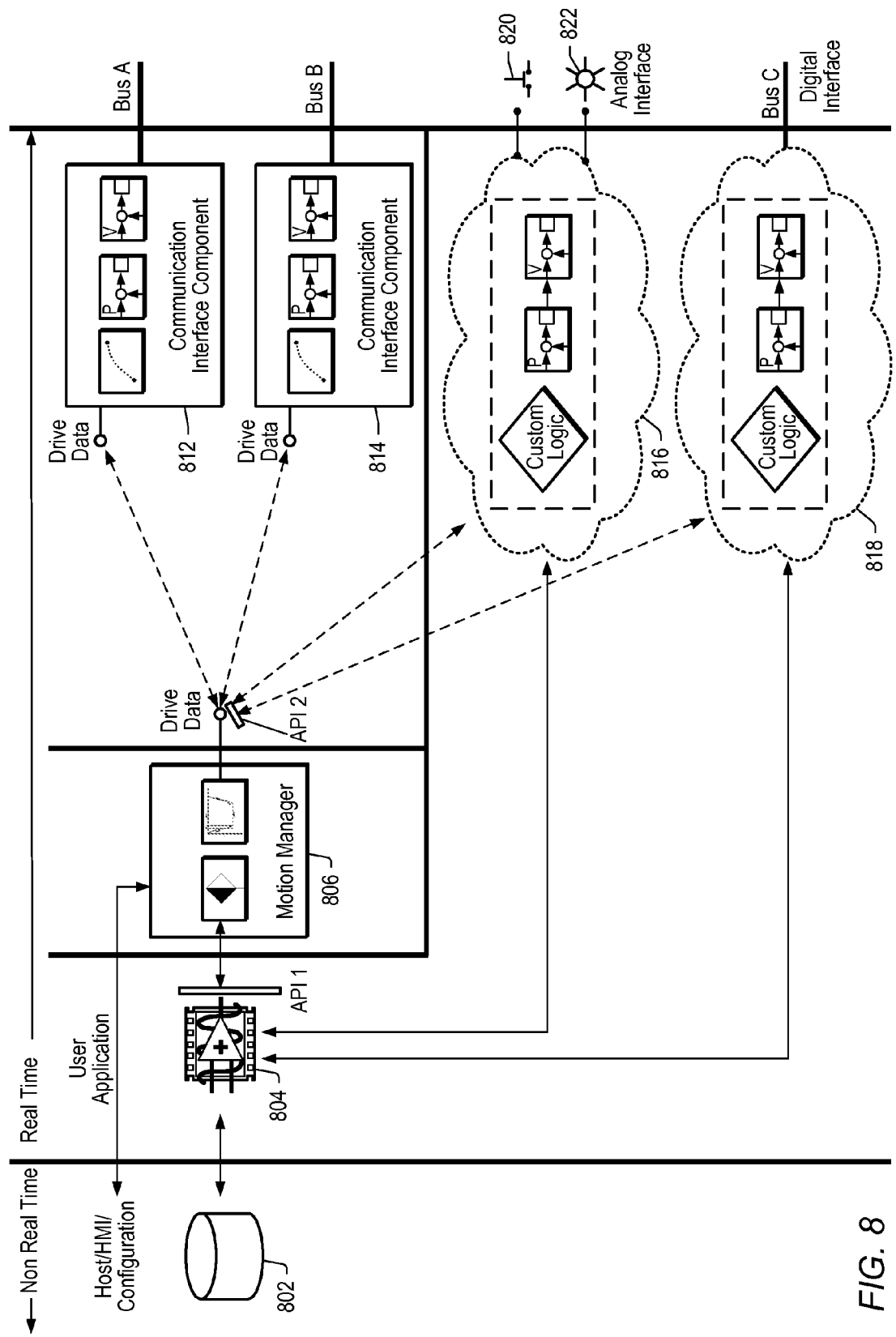
FIG. 8 illustrates an exemplary motion control system with both pre-defined axes and custom axes, according to one embodiment.

FIG. 8—Exemplary Motion Control System with Pre-Defined and Custom Axes

FIG. 8 illustrates an exemplary motion control system, according to one embodiment, where multiple control axes are implemented, including two pre-defined axes and two custom axes, although it should be noted that the number and types of axes shown are meant to exemplary only, and are not intended to limit the motion control system to any particular number or type of axes.

As FIG. 8 shows, in this embodiment, the motion control system may include a real time portion, including a user application 804, motion manager 806, and communication interface components 812, 814, 816, and 818. In some embodiments, the system may also include one or more non-real time components, such as host/HMI (human machine interface)/configuration components 802. For example, the motion control system may include a mass storage device (or computer system) that stores various host, HMI, or configuration programs, tools, or data, as desired.

As shown, the motion manager 806 may communicate with the user application 804 via a specified API, labeled API 1. In other words, the user application may make API calls from API 1 to communicate with the motion manager.

In the embodiment of FIG. 8, communication interface components 812 and 814 are pre-defined, e.g., vendor defined, while communication interface components 816 and 818 are customized. The pre-defined communication interface components 812 and 814 each includes respective interpolation, position loop, and velocity loop components, although these components are optional. As shown, these pre-defined communication interface components couple to respective buses, bus A and bus B, and communicate over these buses via pre-defined protocols. Similarly, note that the motion manager 806 communicates with communication interface components 812 and 814 via internal protocols, i.e., internally via pre-defined conventions. More specifically, these pre-defined or standard communication interfaces with "non-customizable" logic are provided by a motion vendor (as interfaces to bus A and bus B).

In contrast, custom communication interface components 816 and 818 include optional position loop, and velocity loop components, but also include custom logic, i.e., user developed code that may include a communication protocol for communicating with the drive. These custom communication interface components (816 and 818) may communicate with the motion manager 806 via a second specified API, e.g., API 2. In other words, the custom logic in each custom communication interface component may include API calls from API 2 to communicate with the motion manager. In this manner, the user may define (via the custom logic) functions that directly access drive data, and thus circumvent pre-defined communication protocols and means (i.e., standard vendor communication interfaces) with their limitations.

Note that per FIG. 8, custom interfaces developed by the user are seen communicating to IO directly (via an analog interface 820 and 822) and via bus C (a digital interface), respectively. Since the motion controller has prior knowledge of the standard communication interfaces 812/814, it directly writes the drive command data for those interfaces and reads the current data when the motion scan runs. In contrast, the custom communication interfaces 816/818 may access the data using API 2, e.g., a register level API, to explicitly read the drive command data and write the drive current data to the motion manager component when the program scan runs. Note that in some embodiments, the first API (used by the user application) is the same for both custom and standard or pre-defined axes. Similarly, in some embodiments where a configuration environment is provided, the configuration environment may be the same for both custom and standard or pre-defined axes.

Figure 10:
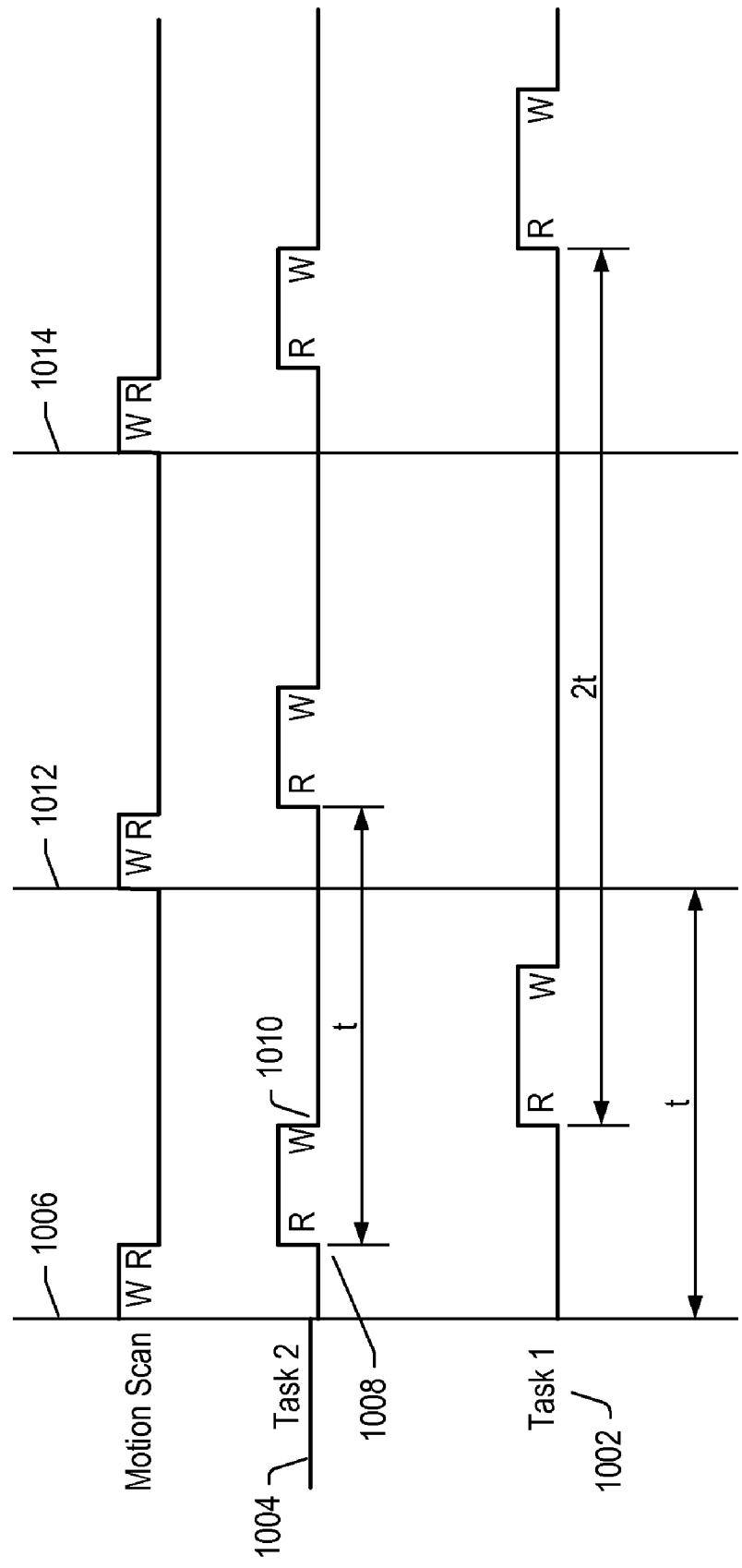
FIG. 10 is an exemplary timing diagram for a motion control system, according to one embodiment.

The custom communication interfaces may ensure that the program which performs this update of drive command and current data runs at the highest priority immediately after the motion scan), and at the same rate as the motion scan, as illustrated in FIG. 10, described below.

Figure 9:
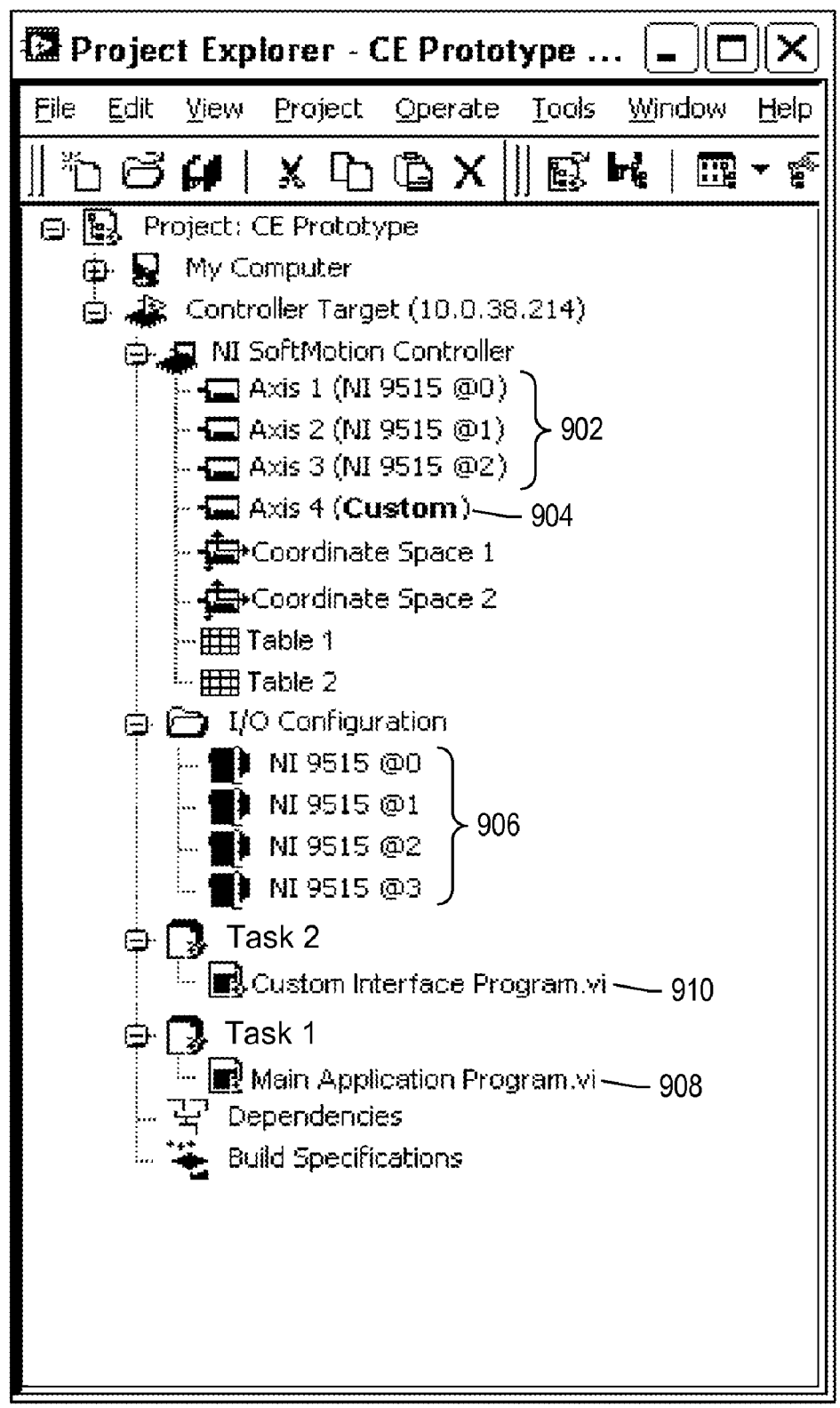
FIG. 9 is a screenshot of an exemplary directory illustrating software components of a motion control system, according to one embodiment.

FIG. 9 is a screenshot of an exemplary directory illustrating software components of a motion control system stored in a computer-readable memory medium, according to one embodiment. As FIG. 9 shows, in this example, three standard or pre-defined (e.g., by a vendor) control axes 902 are specified and stored, as well as a custom axis 904. As discussed above, the standard or pre-defined axes bound to known hardware, e.g., standard communication interfaces, while the custom axis is customized, e.g., left "unbound", so that its data can be accessed by user code, e.g., by a custom communication interface component.

I/O configuration 906 for standard axes is also represented, specifying, for example, known hardware/predefined communication interfaces available to the user.

As also indicated, the directory also includes a main application program 908, referred to as Task 1, which is optional (some dedicated motion controllers may not require such an application), as well as a custom interface program 910, referred to as Task 2, which is a user program that handles communication with (custom) axis 4 and custom hardware, and is required to run at same rate as motion scan. As noted above, the main application program interfaces with the motion controller, specifically, the motion manager component, via a first API, e.g., API 1, and the custom interface program interfaces with the motion controller, i.e., the motion manager component, via a second API, e.g., API 2. Note that in the embodiment of FIG. 9, both the main application program and the custom interface program are graphical programs developed in the LabVIEW graphical program development environment, as denoted by the ".vi" file name suffix; however, in other embodiments, any programming languages or development environments may be used as desired.

Thus, the memory medium may store program instructions implementing the above-described motion manager component, first API, and second API. Moreover, in some embodiments, the program instructions may also be executable to implement one or more vendor defined communication interface components, where the one or more vendor defined communication interface components are configured to communicate with a pre-defined motion element. All of these software components or programs are described below in more detail.

In some embodiments, the program instructions may also be executable to implement a software development environment for creating the user developed motion control application and the user developed communication interface component. For example, in one embodiment, the software development environment may be a graphical programming development environment, such as the LabVIEW graphical programming development environment.

FIG. 10—Exemplary Timing Diagram

FIG. 10 is an exemplary timing diagram for a motion control system, according to one embodiment of the present invention. In this diagram, the horizontal axis is time.

As FIG. 10 shows, a motion scan (top plot) may execute at a specified frequency, i.e., with period t, performing reads and writes to the drives in the system at specified times 1006, 1012, and 1014 (where time 1012=time 1006+t, and time 1014=time 1006+2t). The motion scan may execute motion logic and update drive data on standard communication interfaces.

Two tasks are also shown, where task 1 1002 (bottom plot) represents a user application that communicates with the motion controller via API 1, e.g., updating the motion manager (e.g., the trajectory generator) every two motion scans, by performing reads. In other words, the user application/task 1 may perform reads and writes to the motion manager via API 1. As may be seen, the user application program (task 1) that controls the entire motion application is shown to be running every other motion scan, i.e., at half the frequency of the motion scan, i.e., with a period of 2t, although any other frequency/period may be used as desired.

Task 2 1004 represents a custom logic or code (program) that communicates with the motion controller via API 2, e.g., updating the custom communication interfaces immediately after the motion scan. Note that the data written back to the motion controller by task 2 are consumed to create new data for the next motion scan. As indicated, per period, immediately after the motion scan, task 2 (the custom logic) reads new drive command data from the motion manager (R(ead) 1008), and writes current data from the drives back into the motion manager (W(rite) 1010).

Thus, while the user application (task 1) may execute at any frequency desired, in preferred embodiments, the custom code (task 2) executes at the same frequency as the motion scan.

Figure 11:
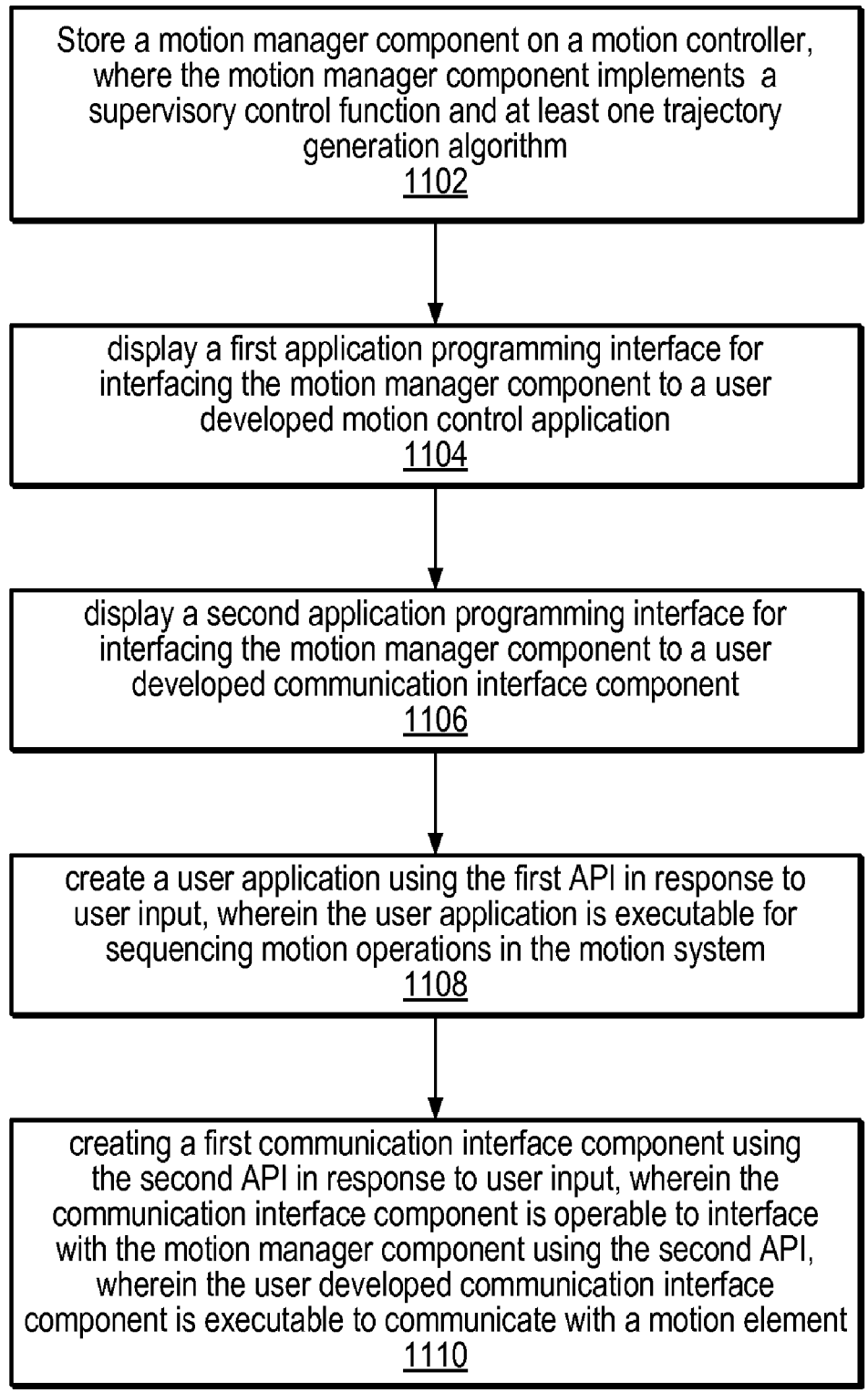
FIG. 11 is a high-level flowchart of a method for developing a motion application, according to one embodiment.

FIG. 11—Method for Developing a Motion Control System

FIG. 11 is a high-level flowchart of a method for developing a motion application, according to one embodiment. In various embodiments, some of the method elements shown may be performed currently, in a different order than shown, or may be omitted. Additional method elements may be performed as desired. The method may be performed as follows:

In 1102, a motion manager component may be stored on a motion controller, where the motion manager component implements a supervisory control function and at least one trajectory generation algorithm. It should be noted that the term "motion manager component" is meant to be descriptive only, and is not intended to limit the invention to any particular form or function.

In 1104, a first application programming interface (API) for interfacing the motion manager component to a user developed motion control application may be displayed. The first API may be displayed in any of a variety of ways. For example, in some embodiments, one or more menus or lists of API functions may be displayed, from which API calls may be selected. In another embodiment, the first API may include a plurality of graphical program nodes, e.g., a palette of graphical program nodes, from which the user may select nodes for inclusion in a graphical program.

In 1106, a second API for interfacing the motion manager component to a user developed communication interface component may be displayed. As with the first API, in various embodiments, the second API may be displayed in any of a variety of ways, e.g., via one or more menus or lists of API functions, or via graphical program nodes. For example, in some embodiments, the second API for interfacing to a user developed communication interface component may include one or more graphical program nodes, where each of the one or more graphical program nodes is operable to be included in a graphical program, and where each of the one or more graphical program nodes is executable to interface to the motion manager component. In one embodiment, the second API may be in the form of a plurality of graphical program nodes, e.g., a palette of graphical program nodes, where the nodes are selectable by the user for inclusion in a graphical program.

Figure 12:
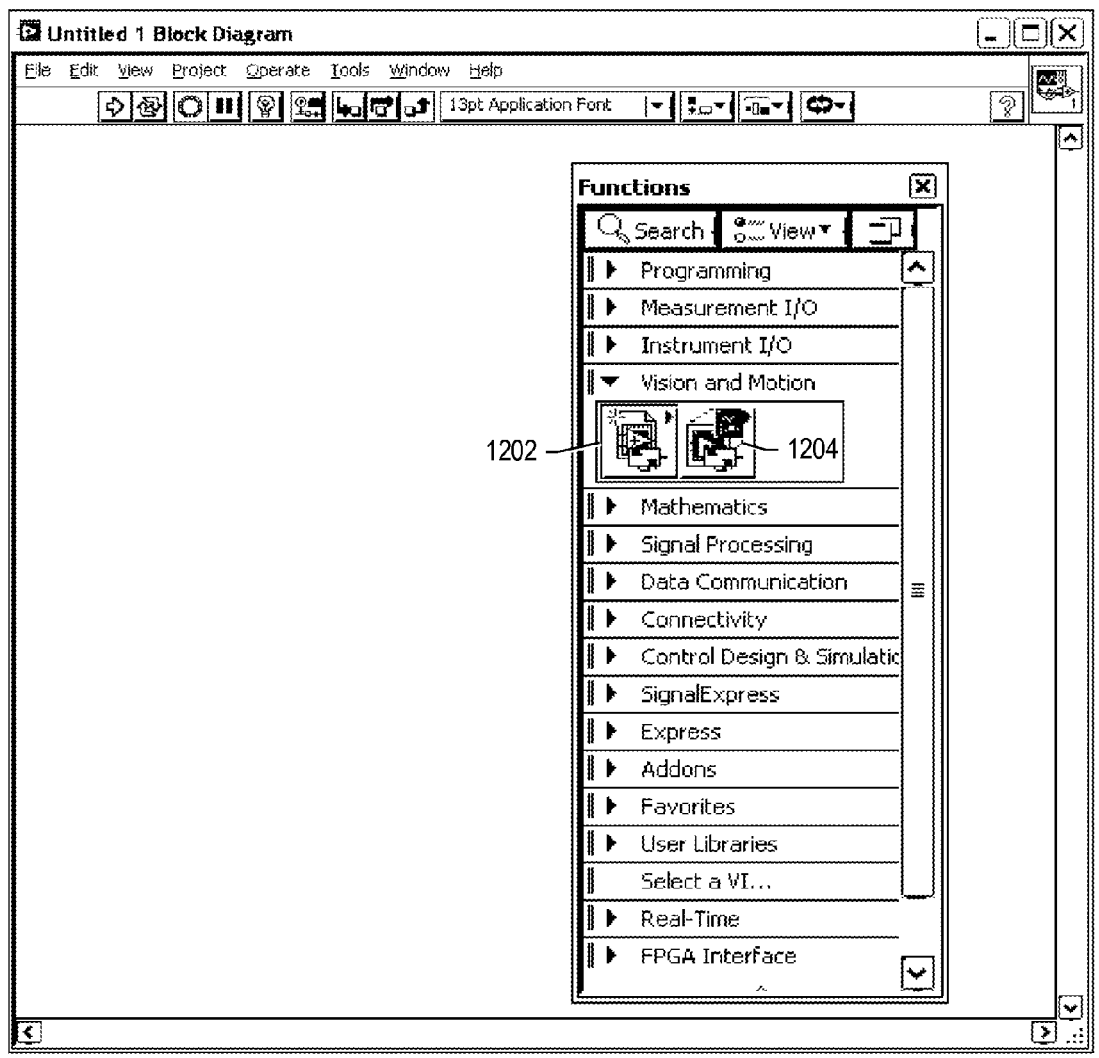
FIG. 12 is a screenshot of an exemplary graphical program editing window wherein API palette icons are displayed, according to one embodiment.
Figure 13:
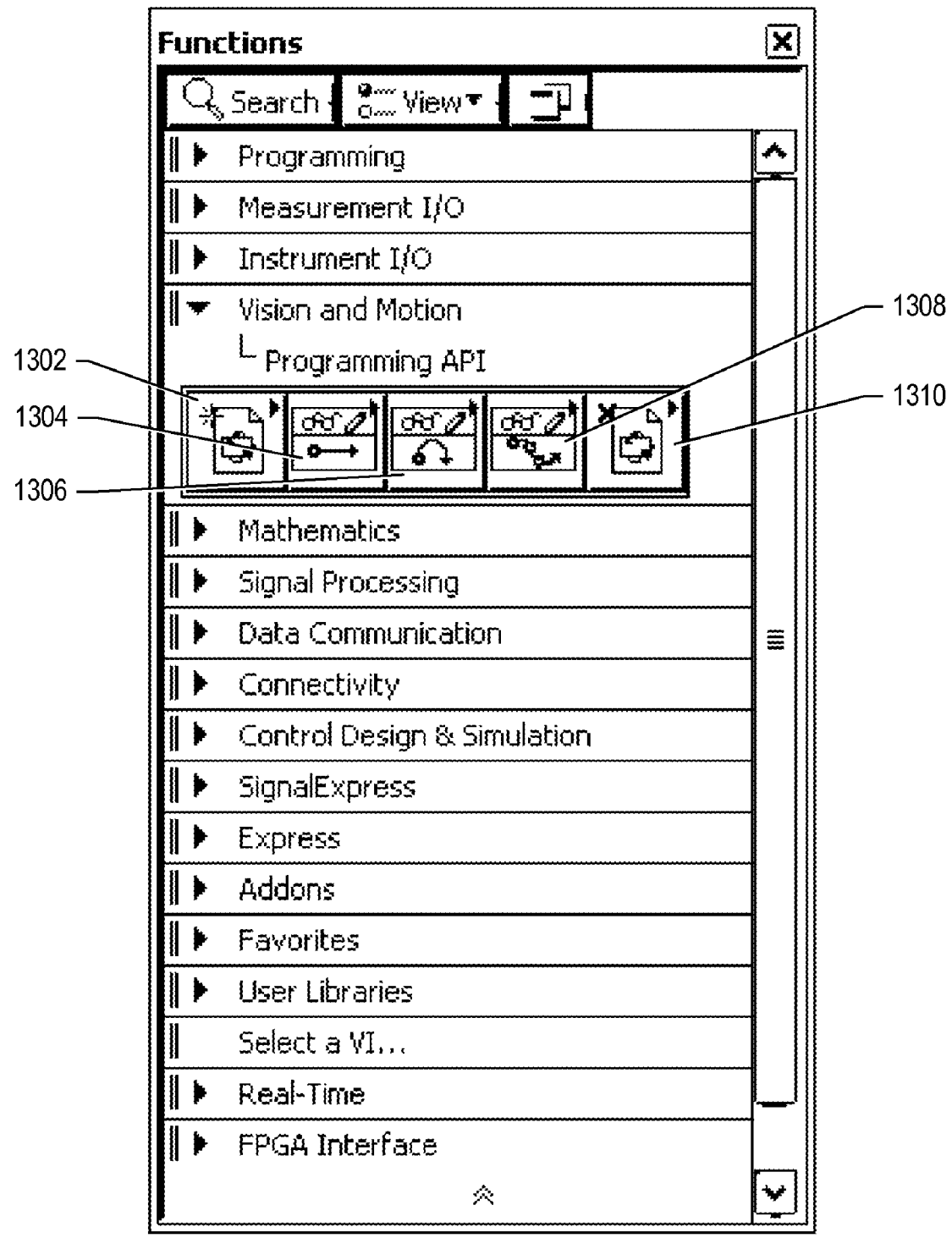
FIG. 13 illustrates a graphical node API palette for a user-defined motion application, according to one embodiment.

FIG. 12 is a screenshot of an exemplary graphical program editing window wherein a list of invocable functions is displayed, including API palette icons 1202 and 1204, representing the first and second APIs, respectively. User selection of one of these icons may thus invoke display of a palette (or menu) of graphical program nodes implementing the API. For example, FIG. 13 illustrates the display of a graphical node palette for the first API under the label "Programming API". The user may select nodes from the palette for inclusion in a graphical program, e.g., via dragging and dropping the node onto a block diagram (graphical program), e.g., of a user application. This exemplary palette includes an open API reference node 1302 that opens a reference to the first API, and a close API reference node 1310 that closes or clears the reference, as well as three move nodes, specifically, a straight line move node 1304, an arc move node 1306, and a contour move node 1308, although it should be noted that these nodes are meant to be exemplary only, and are not intended to limit the nodes (or APIs) described herein to any particular form, appearance, or function.

Figure 14:
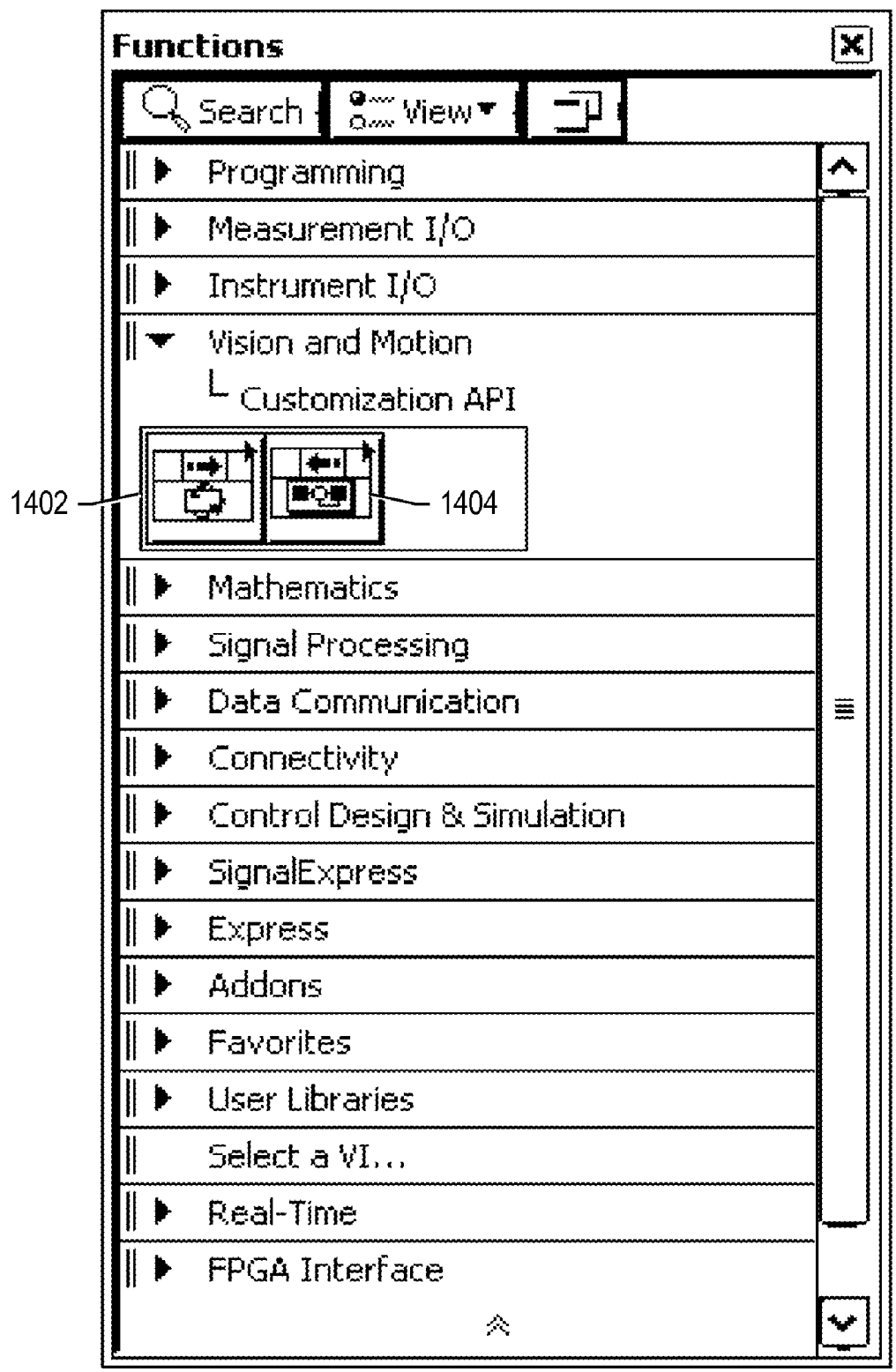
FIG. 14 illustrates a graphical node API palette for a user-defined communication interface component, according to one embodiment.

Similarly, FIG. 14 illustrates the display of a graphical node palette for the first API under the label "Customization API", from which the user may select nodes for inclusion in a graphical program, e.g., via dragging and dropping the node onto a block diagram (graphical program), e.g., of a custom communication interface component. In this exemplary palette are displayed a read node 1402, which is executable to read command data from the motion manager (and writes the data to the drive), and a write node 1404, which is executable to write drive data (from the drive) to the motion manager. Thus, in some embodiments, the second API may include at least one read command and at least one write command.

Of course, in other embodiments, one or both of the APIs may assume other forms. For example, in a text-based programming environment, an API may be a list of functions that the user may include in a text-based program, e.g., by dragging and dropping, double clicking, or simply typing the function call into the program.

In 1108, a user application may be created using the first API in response to user input, where the user application is executable for sequencing motion operations in the motion system. Said another way, the user may create the user application for the motion control system, where the user application includes API calls from the first API. As noted above, in some embodiments, the user may create the application by dragging and dropping (or otherwise selecting) graphical program nodes from the first API onto a block diagram of a graphical program. In other embodiments, e.g., in text-based programming systems, the user may simply include textual API function calls in a text-based application program. In other embodiments, any other means for making API calls in the user application may be used as desired.

Figure 15:
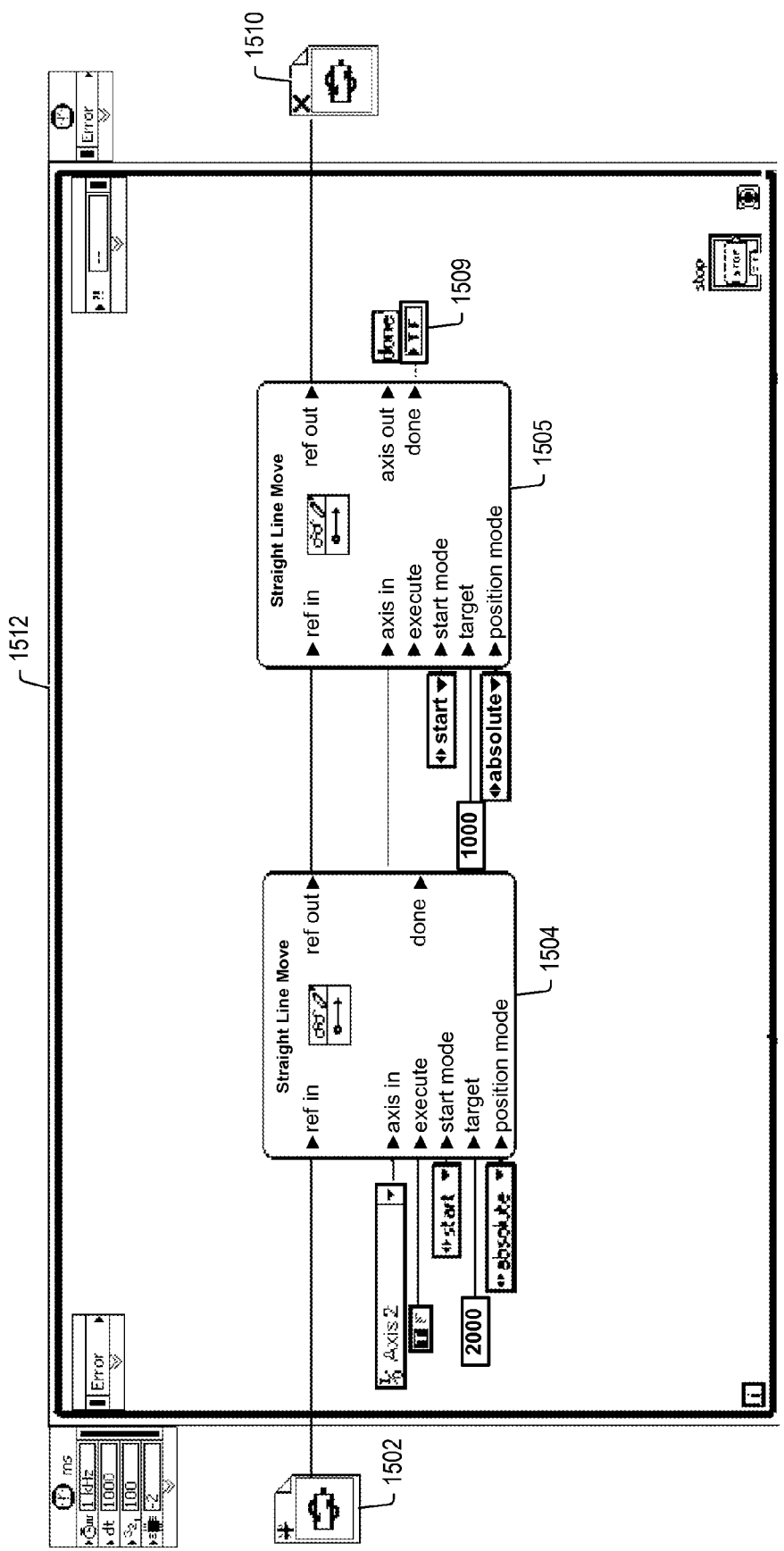
FIG. 15 illustrates an exemplary graphical communication interface component for a motion control system, according to one embodiment.

An example of a graphical user application, according to one embodiment, is illustrated in FIG. 15. This exemplary user application includes a plurality of interconnected graphical program nodes that visually represent functionality of the program, and whose nodes are executable to perform this functionality. As may be seen, the graphical program of FIG. 15 includes various nodes, including some selected from the first API (see, e.g., FIG. 13). For example, nodes 1504 and 1505 respectively represent or specify two sequential straight line move operations. Each of these nodes was included in the graphical program via selection of the straight line move node 1304 of FIG. 13. Note that these nodes are both located within a loop node 1512 that specifies iterative execution of graphical program elements contained within the loop. Note also that to the far left and right of the block diagram are open and close reference nodes 1502 and 1510 that control access to the first API (the motion programming API used by the user application). These nodes correspond to palette node icons 1302 and 1310, respectively.

Thus, when the user application executes, the open API reference node 1502 opens a reference to the first API, then the first straight line move node 1504 executes, followed by the second straight line move node 1505. Straight line move node 1504 moves the axis to a first specified position. Note that in the embodiment shown, the move nodes are edge triggered. More specifically, they execute upon transition of an "execute" parameter from FALSE (low) to TRUE (high), where the default value of "execute" is FALSE. Note that when the graphical program executes the "execute parameter" is set to a constant TRUE value, which the node perceives as a transition from FALSE to TRUE, and so the node then executes. Thus, the execution of the first move node 1504 may require being edge triggered to start a move, and so may start the move in the first iteration of the loop. Once the move is complete, an output parameter "done" of the first move node 1504 (originally set to FALSE) is set to TRUE.

Straight line move node 1505 is executable to move the axis to a second specified position. Note that the output "done" of the first straight line move node 1504 is coupled to input "execute" of the second straight line move node 1505. As noted above, when the first move operation (node 1504) finishes executing, "done" of node 1504 is set to TRUE. Being coupled to the "execute" parameter of node 1505, this transition edge triggers "execute" on node 1505, which then causes the node to execute. Since the "execute" parameter of node 1504 is set to a constant "TRUE" upon the node's first execution, no further transitions are possible while the loop is executing, and so the two nodes only execute once per program execution, but the loop may continue iterating (doing nothing) until the user terminates the loop execution. Note that indicator 1509 is set to TRUE once the sequence of moves completes. When the loop terminates, the close API reference node 1510 may execute to close the reference to the first API.

It should be noted that the application program shown is meant to be illustrative only, and is not intended to limit the user application to any particular form, function, or appearance.

In 1110, a first communication interface component may be created using the second API in response to user input, where the communication interface component is operable to interface with the motion manager component using the second API. The user developed communication interface component may be executable to communicate with a motion element, which in various embodiments may be a drive, e.g., that controls or drives a motor or other actuator, or a simulation, e.g., a drive simulator. Such simulations may be used, for example, in product development or testing, e.g., when the actual physical motors or actuators are not available or not needed.

An example of a custom graphical communication interface component, according to one embodiment, is illustrated in FIGS. 16A-B. Being a graphical program, this exemplary custom communication interface component includes a plurality of interconnected graphical program nodes that visually represent functionality of the program, and whose nodes are executable to perform this functionality. As may be seen, the graphical program of FIGS. 16A-B includes various nodes, including some selected from the second API (see, e.g., FIG. 14). For example, node 1602 represents or specifies a custom hardware target, specifically, a field programmable gate array (FPGA), that implements a custom drive for the motion control system. Loop node 1612 specifies iterative execution of graphical program elements inside the loop, and represents a user-defined custom communication interface task (e.g., task 2). Write node 1604, labeled "Write Axis Data", is executable to write drive data (from the drive (or simulation)) to the motion manager. Note that write node 1604 was included in the block diagram via selection of the write node icon 1404 displayed in the second API palette. As is also shown in the graphical program, read node 1606, labeled "Read Axis Data", is executable to read command data from the motion manager (and write the command data to the drive (or simulation)). Note that in this example the write and read nodes are located in respective portions of a sequence structure 1614 that specifies sequential execution of the nodes, from left to right, e.g., the write node 1604 executes, writing motion I/O data obtained from the custom hardware to the controller, followed by execution of the read node 1606, which, in this example, reads spline data from the motion controller and passes the data on to a spline engine, as indicated in FIG. 16B. Note that the various nodes labeled with eyeglass/pencil icons are related to configuration and operation of the custom target hardware.

The motion controller preferably includes a processor and memory (which may include multiple memory media, possibly distributed over a network), where the memory stores the motion manager component, the user application, and the user developed first communication interface component. Moreover, the motion controller may be included in a motion control system, also referred to as a motion system, that includes a motion element (a drive or simulation). The motion controller may be coupled to the motion element, and may be operable to control the motion element, i.e., providing trajectory information to the motion element, e.g., for controlling a UUT.

In 1112, a vendor-defined communication interface component may be stored, where the vendor defined communication interface component is configured to communicate with a pre-defined motion element, e.g., a standard or vendor-supplied drive. In other words, in addition to the user-defined communication interface component, a vendor-defined communication interface component may be also be stored for use, e.g., in conjunction with the user-defined communication interface component. For example, as illustrated in FIGS. 8 and 9, in one embodiment, both custom and pre-defined axes may be specified and implemented in the motion control application, e.g., to control respective motion elements. In another embodiment, the first communication interface component may be operable to interface with the vendor-defined communication interface component. In other words, the first (custom) communication interface component may be communicatively interposed between the motion manager and the vendor-defined communication interface component, and may thus affect operations of that component. Thus, in this way, the user-developed first communication interface component may be used to implement at least partial customization of the vendor-defined communication interface component.

Note that, as indicated above, in preferred embodiments, the motion (control) system may be operable to perform motion scans at a specified frequency, and the first communication interface component may be configured to execute at the specified frequency. Note also that the user application may not be so constrained.

The motion control application may then be deployed and/or executed as desired to perform the specified motion tasks.

Thus, various embodiments of the above systems and methods may allow a user to develop and use a motion control system that may include one or more custom control axes, and may also accommodate one or more vendor-defined (i.e., pre-defined) axes.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A non-transitory computer-readable memory medium comprising program instructions executable to implement:
   a motion manager component of a motion controller, wherein the motion manager component implements a supervisory control function and at least one trajectory generation algorithm;
   a first application programming interface (API) for interfacing a motion control application developed by an end user to the motion manager component; and
   a second application programming interface for interfacing the motion manager component to a communication interface component developed by the end user, wherein the communication interface component is executable to communicate with a motion element, wherein the second API for interfacing to the communication interface component comprises one or more graphical program nodes, wherein each of the one or more graphical program nodes is configured to be included in a graphical program, and wherein each of the one or more graphical program nodes is executable to interface to the motion manager component;
   wherein, during operation, the motion control application communicates with the motion manager component via the first API, the motion manager component communicates with the communication interface component via the second API, and the communication interface component communicates with the motion element.

2. The non-transitory computer-readable memory medium of claim 1,
   wherein the second API for interfacing to the communication interface component comprises a plurality of graphical program nodes.

3. The non-transitory computer-readable memory medium of claim 1,
   wherein the second API comprises at least one read command and at least one write command.

4. The non-transitory computer-readable memory medium of claim 1, wherein the program instructions are further executable to implement:
   one or more vendor defined communication interface components, wherein the one or more vendor defined communication interface components are configured to communicate with a pre-defined motion element.

5. The non-transitory computer-readable memory medium of claim 1, wherein the program instructions are further executable to implement:
   a palette of graphical program nodes which compose the second API.

6. The non-transitory computer-readable memory medium of claim 1, wherein the program instructions are further executable to implement:
   a software development environment for creating the motion control application and the communication interface component.

7. The non-transitory computer-readable memory medium of claim 6,
   wherein the software development environment is a graphical programming development environment.

8. The non-transitory computer-readable memory medium of claim 1,
   wherein the motion manager component is executable to perform motion scans at a specified frequency, and wherein the communication interface component is configured to execute at the specified frequency.

9. A method for developing a motion system, comprising: utilizing a computer to perform:
   storing a motion manager component on a motion controller, wherein the motion manager component implements a supervisory control function and at least one trajectory generation algorithm;
   displaying a first application programming interface (API) for interfacing a motion control application developed by an end user to the motion manager component;
   displaying a second API for interfacing the motion manager component to a communication interface component developed by the end user, wherein the second API for interfacing to the communication interface component comprises one or more graphical program nodes, wherein each of the one or more graphical program nodes is configured to be included in a graphical program, and wherein each of the one or more graphical program nodes is executable to interface to the motion manager component;
   creating an application that incorporates at least a portion of the first API in response to input from the end user, wherein the application is executable for sequencing motion operations in the motion system;
   creating a first communication interface component that incorporates at least a portion of the second API in response to input from the end user, wherein the communication interface component is configured to interface with the motion manager component using the second API, wherein the communication interface component is executable to communicate with a motion element;

wherein, during operation of the motion system, the application communicates with the motion manager component via the first API, the motion manager component communicates with the communication interface component via the second API, and the communication interface component communicates with the motion element.

10. The method of claim 9,
wherein the second API comprises a plurality of graphical program nodes.

11. The method of claim 9, further comprising:
storing a vendor defined communication interface component, wherein the vendor defined communication interface component is configured to communicate with a pre-defined motion element.

12. The method of claim 9,
wherein the first communication interface component is configured to interface with a vendor defined communication interface component.

13. The method of claim 9,
wherein the motion system is configured to perform motion scans at a specified frequency, and wherein the first communication interface component is configured to execute at the specified frequency.

14. The method of claim 9, wherein the motion element comprises one or more of:
a drive; or
a simulation.

15. A motion control system, comprising:
a motion element; and
a motion controller coupled to the motion element, wherein the motion controller comprises a processor and memory, and wherein the memory stores program instructions executable by the processor to implement:
a motion manager component, wherein the motion manager component implements a supervisory control function and at least one trajectory generation algorithm;
an application developed by an end user that is executable for sequencing motion operations in the motion system, wherein the application is executable to interface to the motion manager component using a first application programming interface (API); and
a first communication interface component developed by the end user that is executable to communicate with the motion element, wherein the first communication interface component is executable to interface to the motion manager component using a second API, wherein the second API for interfacing to the communication interface component comprises one or more graphical program nodes, wherein each of the one or more graphical program nodes is configured to be included in a graphical program, and wherein each of the one or more graphical program nodes is executable to interface to the motion manager component;

wherein, during operation, the application communicates with the motion manager component via the first API, the motion manager component communicates with the first communication interface component via the second API, and the first communication interface component communicates with the motion element.

16. The motion control system of claim 15, further comprising:
a vendor-defined communication interface component, wherein the vendor defined communication interface component is configured to communicate with a pre-defined motion element.

17. The motion control system of claim 16, wherein the communication interface component is configured to interface with the vendor-defined communication interface component.

18. The motion control system of claim 15,
wherein the motion controller is configured to perform motion scans at a specified frequency, and wherein the first communication interface component is configured to execute at the specified frequency.

19. The motion control system of claim 15, wherein the motion element comprises one or more of:
a drive; or
a simulation.

* * * * *

UNITED STATES PATENT AND TRADEMARK OFFICE
CERTIFICATE OF CORRECTION

| | |
|---|---|
| PATENT NO. | : 8,082,515 B2 |
| APPLICATION NO. | : 11/948421 |
| DATED | : December 20, 2011 |
| INVENTOR(S) | : Chandhoke et al. |

It is certified that error appears in the above-identified patent and that said Letters Patent is hereby corrected as shown below:

In the Claims:

Claim 17, column 24, line 28-29, please delete "the communication interface" and substitute "the first communication interface".

Signed and Sealed this
Twenty-eighth Day of February, 2012

David J. Kappos
*Director of the United States Patent and Trademark Office*